United States Patent
Chiba et al.

(10) Patent No.: US 9,476,127 B2
(45) Date of Patent: Oct. 25, 2016

(54) METHOD FOR PROCESSING COOLING WATER SYSTEM

(71) Applicant: KURITA WATER INDUSTRIES LTD., Nakano-ku, Tokyo (JP)

(72) Inventors: Ikuko Chiba, Tokyo (JP); Naohiro Nagai, Tokyo (JP); Takanori Yoshino, Tokyo (JP); Masato Nakano, Osaka (JP); Yuki Sano, Osaka (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 0 days.

(21) Appl. No.: 14/433,185

(22) PCT Filed: Oct. 1, 2013

(86) PCT No.: PCT/JP2013/076749
§ 371 (c)(1),
(2) Date: Apr. 2, 2015

(87) PCT Pub. No.: WO2014/054661
PCT Pub. Date: Apr. 10, 2014

(65) Prior Publication Data
US 2015/0203971 A1    Jul. 23, 2015

(30) Foreign Application Priority Data
Oct. 3, 2012    (JP) ................. 2012-221515

(51) Int. Cl.
| | |
|---|---|
| *C23F 11/173* | (2006.01) |
| *C02F 5/10* | (2006.01) |
| *C23F 11/08* | (2006.01) |
| *C23F 11/10* | (2006.01) |
| *C08F 220/06* | (2006.01) |
| *C02F 1/68* | (2006.01) |
| *C02F 103/02* | (2006.01) |

(52) U.S. Cl.
CPC ............ *C23F 11/173* (2013.01); *C02F 5/10* (2013.01); *C23F 11/08* (2013.01); *C23F 11/10* (2013.01); *C02F 1/683* (2013.01); *C02F 2103/023* (2013.01); *C08F 220/06* (2013.01)

(58) Field of Classification Search
CPC .................................................. C23F 11/173
See application file for complete search history.

(56) References Cited

U.S. PATENT DOCUMENTS

| | | | |
|---|---|---|---|
| 5,948,268 | A | 9/1999 | Yamaguchi et al. |
| 6,835,790 | B2 | 12/2004 | Fukuhara et al. |
| 6,998,453 | B2 | 2/2006 | Yoneda et al. |
| 2010/0298526 | A1 | 11/2010 | Tsumori et al. |

FOREIGN PATENT DOCUMENTS

| | | |
|---|---|---|
| CN | 1417240 A | 5/2003 |
| EP | 1433796 A1 | 6/2004 |
| JP | H11-057783 A | 3/1999 |
| JP | 2002-003535 A | 1/2002 |
| JP | 2002-003536 A | 1/2002 |
| JP | 2004-211137 A | 7/2004 |
| JP | 2004-307588 A | 11/2004 |
| JP | 2005-264190 A | 9/2005 |
| JP | 2011-202243 A | 10/2011 |
| WO | 2009/060965 A1 | 5/2009 |
| WO | 2015/012362 A1 | 1/2015 |

OTHER PUBLICATIONS

English Machine Translation of Iseri et al. JP 2005-264190. Sep. 29, 2005. Retrieved from J-PlatPat.*
English Machine Translation of Fugita. JP 2011-202243. Oct. 13, 2011. Retrieved from J-PlatPat.*
Chapter 24—Corrosion Control—Cooling Systems. GE Power and Water, Water and Process Technology. Wayback Machine Capture from Jul. 6, 2008.*
PCT, "International Search Report for PCT/JP2013/076749", Dec. 3, 2013.
Singapore Patent Office, "Search Report and Written Opinion for Singapore Patent Application No. 11201502632X," Dec. 22, 2015.
China Patent Office, "Office Action for Chinese Patent Application No. 201380051987.3," Mar. 4, 2016.
Europe Patent Office, "Search Report for European Patent Application No. 13843604.3," May 6, 2016.
China Patent Office, Office Action for Chinese Patent Application No. 201380051987.3, Aug. 8, 2016.

* cited by examiner

*Primary Examiner* — Sean E Conley
*Assistant Examiner* — Donald Spamer
(74) *Attorney, Agent, or Firm* — Manabu Kanesaka

(57) ABSTRACT

A method for treating a cooling water system comprises adding, in a cooling water system having calcium hardness of 250 mg/L or less as $CaCO_3$, a treatment agent containing a (meth)acrylic acid-based copolymer. The (meth)acrylic acid-based copolymer comprises a structural unit (a) derived from a (meth)acrylic acid-based monomer (A) represented by the following general formula (1) and a structural unit (b) derived from a specific (meth)allyl ether-based monomer (B) represented by the following general formula (2), a content of the structural unit (b) is 1 to 15 mol % relative to 100 mol % of structural units derived from all the monomers, a weight average molecular weight of the (meth)acrylic acid-based copolymer is 7,000 to 28,000, and at least one of the main chain terminals of the (meth)acrylic acid-based copolymer is a sulfonic acid group or a salt thereof.

8 Claims, No Drawings

US 9,476,127 B2

METHOD FOR PROCESSING COOLING WATER SYSTEM

RELATED APPLICATIONS

The present application is National Phase of International Application No. PCT/JP2013/076749 filed Oct. 1, 2013, and claims priority from Japanese Application No. 2012-221515, filed Oct. 3, 2012, the disclosure of which is hereby incorporated by reference herein in its entirety.

TECHNICAL FIELD

The present invention relates to a method for treating a cooling water system. Specifically, it relates to a method for treating a cooling water system which, in a cooling water system having low calcium hardness, prevents metal corrosion of heat-transfer surfaces of a heat exchanger and the like.

BACKGROUND ART

Metal members installed in an open circulating cooling water system, for example, a heat exchanger, a reaction tank, and a pipe made of carbon steel, copper, or a copper alloy become corroded by coming in contact with cooling water. Therefore, there is generally provided an anti-corrosion treatment by addition of a chemical agent.

In order to suppress corrosion of the heat exchanger, the reaction tank, and the pipe made of carbon steel, there is being added to the cooling water a phosphorous compound such as an orthophosphoric acid salt, a hexametaphosphoric acid salt, a hydroxyethylidene phosphonic acid salt, a phosphonobutane tricarboxylic acid salt, and the like. There are also cases where a heavy metal salt such as a zinc salt and a bichromate salt are added solely or in a combination.

Particularly, in water quality of low calcium hardness, an anti-corrosion effect due to a calcium hardness component cannot be expected and, therefore, the metal members are easier to be corroded than in water quality of high calcium hardness. Especially when the calcium hardness is 100 mg $CaCO_3$/L or less, a certain amount or more of an anti-corrosion agent such as a phosphoric acid salt and the like needs to be added, and a low molecular weight polymer for dispersing the anti-corrosion agent needs to be added in a high concentration (see Kurita Water Industries' Chemicals Handbook Editing Committee (Eds.), "Kurita Water Industries' Chemicals Handbook (4th ed.)," Entry 178, "7.3.1 Prevention of Corrosion of Carbon Steel, Figure 7.29."). However, this method for treating water is contrary to a trend of recent years to reduce environmental loads.

For this reason, when water of low calcium hardness is used as makeup water for the cooling water, there has been desired a polymer for dispersing the anti-corrosion agent, which will enable the anti-corrosion agent to exhibit a high anti-corrosion effect at a lower concentration.

As a treatment method with a reduced environmental load in a water quality condition where the calcium hardness is low and metal members are easily corroded, there have been proposed methods for improving anti-corrosion effects by means of adjusting water quality components.

For example, in Patent Literature 1, there is disclosed a method for suppressing corrosion of metal in an open circulating cooling water system, comprising: adjusting water quality so that a Langelier index becomes 1.5 or more, and a product of a silica concentration and calcium hardness becomes 2000 or more; and adding a copolymer of maleic acid and isobutylene.

In Patent Literature 2, there is disclosed a method for suppressing corrosion of metal comprising adding, in a specific ratio, a maleic acid-based polymer A and a copolymer B of maleic acid and the like and a nonionic monoethylene-based unsaturated monomer to a water system which has been adjusted so that a Langelier index becomes 1.5 or more, and a product of a silica concentration and calcium hardness becomes 2000 or more.

In Patent Literature 3, there is disclosed a method for suppressing corrosion of metal in a water system, comprising: adding a phosphoric acid salt, a zinc salt, and an M alkalinity component; and adjusting respective concentrations of total phosphoric acid and total zinc to 1 mg/L or less, and a Langelier index at 30° C. to 1.2 or more.

However, in water quality of low calcium hardness, all methods of the Patent Literatures 1 to 3 need addition of an enormous amount of a chemical agent in order to adjust the calcium hardness, the silica concentration, and the Langelier index to certain values.

On the other hand, as a polymer which shows a high scale inhibiting effect and a high anti-corrosion effect in a water system of high calcium hardness, Patent Literature 4 discloses a (meth)acrylic acid-based polymer having a sulfonic acid group at a main chain terminal, whereby, it is described, gelation resistance performance is improved and an excellent anti-corrosion effect is exhibited even in a water system of a high calcium concentration. However, the Patent Literature 4 does not disclose anything about an anti-corrosion effect in a water system of low calcium hardness which has a high tendency to corrode.

CITATION LIST

Patent Literature

Patent Literature 1: Japanese Patent Application Publication No. H4-33868
Patent Literature 2: Japanese Patent Laid-Open Publication No. 2007-119835
Patent Literature 3: Japanese Patent Laid-Open Publication No. 2009-299161
Patent Literature 4: Japanese Patent Laid-Open Publication No. 2005-264190

SUMMARY OF THE INVENTION

Problems to be Solved by the Invention

The present invention was made in view of the above-mentioned circumstances, and an object thereof is to provide a method for treating a cooling water system, which, in a water system where water of low calcium hardness is used as makeup water, prevents metal corrosion of heat-transfer surfaces of a heat-exchanger, a pipe, and the like without addition of a chemical agent of a high concentration.

Means for Solving the Problems

The present inventors conducted diligent research in order to attain the object and, as a result, found that the object can be attained by adding a treatment agent to a cooling water system of low calcium hardness, the treatment agent containing a (meth)acrylic acid-based copolymer which comprises a structural unit (a) derived from a specific (meth)

acrylic acid-based monomer and a structural unit (b) derived from a specific (meth)allyl ether-based monomer in specific amounts, has a specific weight average molecular weight, and at least one of main chain terminals of which is a sulfonic acid group or a salt thereof. This finding led to completion of the present invention.

That is, the present invention provides a method for treating a cooling water system comprising adding, in a cooling water system of calcium hardness of 250 mg/L or less as $CaCO_3$, a treatment agent containing a (meth)acrylic acid-based copolymer, wherein the (meth)acrylic acid-based copolymer comprises a structural unit (a) derived from a (meth)acrylic acid-based monomer (A) represented by the following general formula (1) and a structural unit (b) derived from a (meth)allyl ether-based monomer (B) represented by the following general formula (2), a content of the structural unit (b) is 1 to 15 mol % relative to 100 mol % of structural units derived from all the monomers, a weight average molecular weight of the (meth)acrylic acid-based copolymer is 7,000 to 28,000, and at least one of main chain terminals of the (meth)acrylic acid-based copolymer is a sulfonic acid group or a salt thereof.

[Formula 1]

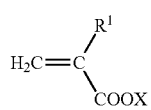

(1)

wherein $R^1$ represents a hydrogen atom or a methyl group; and X represents a hydrogen atom, a metal atom, an ammonium group, or an organic amine group; and

[Formula 2]

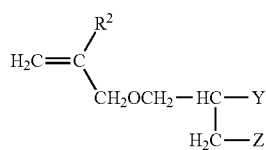

(2)

wherein $R^2$ represents a hydrogen atom or a methyl group; Y and Z each independently represent a hydroxyl group, or a sulfonic acid group or a salt thereof; and at least one of Y and Z represents a sulfonic acid group or a salt thereof.

Effect of the Invention

According to the present invention, there can be provided a method for treating a cooling water system, which, in a water system where water of low calcium hardness is used as makeup water, effectively prevents metal corrosion of heat-transfer surfaces of a heat-exchanger, a pipe, and the like without addition of a chemical agent of a high concentration.

MODE FOR CARRYING OUT THE INVENTION

The method for treating a cooling water system of the present invention comprises adding, in a cooling water system having calcium hardness of 250 mg/L or less as $CaCO_3$, a treatment agent containing a (meth)acrylic acid-based copolymer having a specific structure and weight average molecular weight thereto, and thereby preventing metal corrosion of heat transfer surfaces of a heat exchanger, a pipe, and the like.

[(Meth)Acrylic Acid-Based Copolymer]

The (meth)acrylic acid-based copolymer contained in the treatment agent used in the method for treating a cooling water system of the present invention comprises a structural unit (a) derived from a (meth)acrylic acid-based monomer (A) represented by the following general formula (1) and a structural unit (b) derived from a (meth)allyl ether-based monomer (B) represented by the following general formula (2), wherein at least one of main chain terminals is a sulfonic acid group or a salt thereof:

[Formula 3]

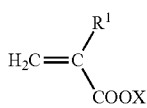

(1)

wherein $R^1$ represents a hydrogen atom or a methyl group; and X represents a hydrogen atom, a metal atom, an ammonium group, or an organic amine group; and

[Formula 4]

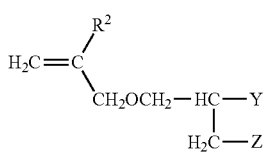

(2)

wherein $R^2$ represents a hydrogen atom or a methyl group; Y and Z each independently represent a hydroxyl group, or a sulfonic acid group, or a salt thereof; and at least one of Y and Z represents a sulfonic acid group or a salt thereof.

The structural unit (a) and the structural unit (b) specifically refer to structural units represented by the following general formulas (3) and (4), respectively:

[Formula 5]

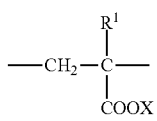

(3)

wherein $R^1$ and X are the same as in the general formula (1); and

[Formula 6]

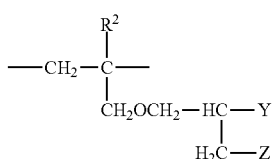

(4)

wherein R², Y, and Z are the same as in the general formula (2).

((Meth)Acrylic Acid-Based Monomer (A))

The (meth)acrylic acid-based monomer (A) is one represented by the general formula (1). Here, as X in the general formula (1), a specific example of a metal atom includes, for example, lithium, sodium, potassium, and the like; and a specific example of an organic amine group includes, for example, monoethanolamine, diethanolamine, triethanolamine, and the like.

A specific example of the (meth)acrylic acid-based monomer (A) includes, for example, acrylic acid, methacrylic acid, and salts of these (for example, sodium salts, potassium salts, ammonium salts, and the like). Among these, acrylic acid, sodium acrylate, and methacrylic acid are preferable, and acrylic acid (AA) is more preferable. These can be used solely or in a combination of two or more kinds.

Meanwhile, the term "(meth)acrylic acid-based" refers to both "acrylic acid-based" and "methacrylic acid-based." The same applies to other similar terms.

((Meth)Allyl Ether-Based Monomer (B))

The (meth)allyl ether-based monomer (B) is one represented by the general formula (2). However, among a sulfonic acid group and a salt thereof which correspond to Y and Z in the general formula (2), a specific example of a metal salt includes, for example, salts of sodium, potassium, lithium, and the like, among which sodium is preferable.

A specific example of a salt of an organic amine group includes salts of monoethanolamine, diethanolamine, triethanolamine, and the like.

A specific example of the (meth)allyl ether-based monomer (B) includes, for example, 3-(meth)allyloxy-2-hydroxy-1-propanesulfonic acid and a salt thereof, and 3-(meth)allyloxy-1-hydroxy-2-propanesulfonic acid and a salt thereof. Among these, sodium 3-(meth)allyloxy-2-hydroxy-1-propanesulfonate is preferable and sodium 3-allyloxy-2-hydroxy-1-propanesulfonate (HAPS) is more preferable. These can be used solely or in a combination of two or more kinds.

Meanwhile, the term "(meth)allyl ether-based" refers to both "allyl ether-based" and "methallyl ether-based." The same applies to other similar terms.

<Molar Ratio>

The (meth)acrylic acid-based copolymer is a copolymer comprising a structural unit (a) derived from a (meth)acrylic acid-based monomer (A) and a structural unit (b) derived from a (meth)allyl ether-based monomer (B), wherein a content of the structural unit (b), relative to 100 mol % of structural units derived from all the monomers, is 1 to 15 mol %, preferably 2 to 10 mol %, and more preferably 3 to 7 mol %. When the content of the structural unit (b) is less than 1 mol %, ability of the copolymer to disperse an anti-corrosion component becomes low and the copolymer becomes unable to exhibit its performance. When the content exceeds 15 mol %, the copolymer disperses the anti-corrosion component too well for an anti-corrosion film to be formed, and thus anti-corrosion performance deteriorates.

On the other hand, from the viewpoint of anti-corrosion performance, the content of the structural unit (a) relative to 100 mol % of structural units derived from all the monomers is preferably 99 to 50 mol %, more preferably 98 to 60 mol %, even more preferably 97 to 80 mol %, and further even more preferably 97 to 90 mol %.

Furthermore, in the (meth)acrylic acid-based copolymer, a molar ratio of [(meth)allyl ether-based monomer (B)]/[(meth)acrylic acid-based monomer (A)] is, from the viewpoint of anti-corrosion performance, preferably 0.01 to 0.2, more preferably 0.02 to 0.15, even more preferably 0.02 to 0.10, and further even more preferably 0.03 to 0.07.

The (meth)acrylic acid-based copolymer may contain a structural unit other than the structural unit (a) and the structural unit (b) in a range which does not impair an effect of the present invention, but the copolymer preferably does not contain other structural unit.

A total content of the structural unit (a) and the structural unit (b) is, relative to 100 mol % of structural units derived from all the monomers, preferably 60 to 100 mol %, more preferably 70 to 100 mol %, even more preferably 80 to 100%, and further even more preferably 90 to 100 mol %.

<Weight Average Molecular Weight>

A weight average molecular weight of the (meth)acrylic acid-based copolymer is, from the viewpoint of anti-corrosion performance, 7,000 to 28,000 and preferably 8,000 to 26,000. When the weight average molecular weight is outside the range, the anti-corrosion effect decreases.

Additionally, the weight average molecular weight is a standard polyacrylic acid-equivalent value according to a gel permeation chromatography method (GPC method).

(Other Monomers (C))

The (meth)acrylic acid-based copolymer suffices if it comprises at least the structural unit (b) in a ratio of 1 to 15 mol % relative to 100 mol % of structural units derived from all the monomers. However, it is preferable that the structural unit (a) is contained in the aforementioned ratio. In addition to these, the copolymer may contain a structural unit (c) derived from other monomers (C) which are copolymerizable with the (meth)acrylic acid-based monomer (A) or the (meth)allyl ether-based monomer (B). In this case, a proportion of the structural unit (c) relative to 100 mol % of structural units derived from all the monomers is preferably 10 mol % or less, and more preferably 5 mol % or less.

A total content of the structural unit (a), the structural unit (b), and the structural unit (c) is, relative to 100 mol % of structural units derived from all the monomers, preferably 60 to 100 mol %, more preferably 70 to 100 mol %, even more preferably 80 to 100 mol %, and further even more preferably 90 to 100 mol %.

The other monomers (C) include, for example, sulfonic acid group-containing unsaturated monomers such as 2-(meth)acrylamide-2-methylpropanesulfonic acid, (meth)allylsulfonic acid, vinylsulfonic acid, styrenesulfonic acid, 2-sulfoethyl methacrylate, and the like, and salts thereof; N-vinyl monomers such as N-vinylpyrrolidone, N-vinylformamide, N-vinylacetamide, N-vinyl-N-methylformamide, N-vinyl-methylacetamide, N-vinyloxazolidone, and the like; nitrogen-containing nonionic unsaturated monomers such as (meth)acrylamide, N,N-dimethylacrylamide, N-isopropylacrylamide, and the like; hydroxyl group-containing unsaturated monomers such as 3-(meth)allyloxy-1,2-dihydroxypropane, (meth)allyl alcohol, isoprenol, and the like; polyoxyethylene group-containing unsaturated monomers such as a compound obtained by adding about 1 to 200 moles of ethylene oxide to 3-(meth)allyloxy-1,2-dihydroxypeopane (3-(meth)allyloxy-1,2-di(poly)oxyethylene ether propane), a compound obtained by adding about 1 to 100 moles of ethylene oxide to (meth)allyl alcohol, and the like; (meth)acrylic acid esters such as methyl(meth)acrylate, ethyl(meth)acrylate, butyl(meth)acrylate, hydroxyethyl(meth)acrylate, and the like; unsaturated dicarboxylic acid monomers such as itaconic acid and the like; and aromatic unsaturated monomers such as styrene and the like.

These monomers (C) can be used solely or in a combination of two or more kinds.

(Method for Production)

A method for producing the (meth)acrylic acid-based copolymer includes a method of polymerizing a monomer mixture containing the monomers (A), (B), and (C) which is used if necessary (hereinafter, also referred to simply as the "monomer mixture") in the presence of a polymerization initiator.

<Polymerization Initiator>

As the polymerization initiator, there can be used a publicly known one. For example, suitable are hydrogen peroxide; persulfates such as sodium persulfate, potassium persulfate, ammonium persulfate, and the like; azo-based compounds such as dimethyl 2,2'-azobis(2-methylpropionate), 2,2'-azobis(isobutyronitrile), 2,2'-azobis(2-methylbutyronitrile), 2,2'-azobis(2,4-dimethylvaleronitrile), 2,2'-azobis(4-methoxy-2,4-dimethylvaleronitrile), dimethyl 2,2'-azobis(isobutyrate), 4,4'-azobis(4-cyanovaleric acid), 2,2'-azobis(2-methylpropionamidine)dihydrogen chloride, 2,2'-azobis[N-(2-carboxyethyl)-2-methylpropionamidine) n-hydrate, 2,2'-azobis[2-(2-imidazolin-2-yl)propane]dihydrogen chloride, 2,2'-azobis[2-(2-imidazolin-2-yl)propane] disulfuric acid dihydrate, 1,1'-azobis(cyclohexane-1-carbonitrile), and the like; organic peroxides such as benzoyl peroxide, lauroyl peroxide, peracetic acid, di-t-butyl peroxide, cumene hydroperoxide, and the like. Among these polymerization initiators, the after-mentioned persulfates are preferably used from the viewpoint of improving gelation resistance of the polymer obtained.

An amount of use of this polymerization initiator is not particularly limited as long as it is an amount that can initiate copolymerization of the monomer mixture. However, except the case particularly described in the following, the amount of the initiator is, relative to 1 mole of the monomer mixture, preferably 15 g or less, and more preferably 1 to 12 g.

<Chain Transfer Agent>

In the method for producing the (meth)acrylic acid-based copolymer, if necessary, there may be used a chain transfer agent as a molecular weight adjusting agent in a range which does not adversely affect the polymerization.

Specifically, the chain transfer agent includes thiol-based chain transfer agents such as mercaptoethanol, thioglycerol, thioglycolic acid, 2-mercaptopropionic acid, 3-mercaptopropionic acid, thiomalic acid, octyl thioglycolate, octyl 3-mercaptopropionate, 2-mecaptoethanesulfonic acid, n-dodecyl mercaptan, octyl mercaptan, butyl thioglycolate, and the like; halides such as carbon tetrachloride, methylene chloride, bromoform, bromotrichloroethane, and the like; secondary alcohols such as isopropanol, glycerin, and the like; lower oxides and salts thereof such as phosphorous acid, hypophosphorous acid, and salts thereof (sodium hypophosphite, potassium hypophosphite, and the like), and sulfurous acid, bisulfurous acid, dithionous acid, metabisulfurous acid, and salts thereof (hereinafter, also referred to as the "bisulfurous acids (bisulfites)." The bisulfites include, for example, sodium bisulfite, potassium bisulfite, sodium dithionite, potassium dithionite, sodium metabisulfite, potassium metabisulfite, and the like); and the like. The chain transfer agents can be used solely or in a combination of two or more kinds.

When these chain transfer agents are used, the molecular weight of the copolymer produced can be prevented from becoming higher than necessary, and a low molecular weight copolymer can be produced efficiently. Among these, in the copolymerization reaction pertaining to the present invention, it is suitable to use the bisulfurous acids (bisulfites). Herewith, it becomes possible to introduce a sulfonic acid group efficiently at a main chain terminal of the copolymer obtained and it also becomes possible to improve the gelation resistance. Further, it is preferable to use the bisulfurous acids (bisulfites) as a chain transfer agent, because, by doing so, a color tone of the copolymer (composition) can be improved.

An amount of the chain transfer agent to be added is not particularly limited as long as it is an amount which allows the monomer mixture to polymerize satisfactorily. However, except the cases particularly described in the following, the amount of the chain transfer agent is, relative to 1 mole of the monomer mixture, preferably 1 to 20 g, and more preferably 2 to 15 g.

<Initiator System>

In the method for producing the (meth)acrylic acid-based copolymer, as an initiator system (a combination of a polymerization initiator and a chain transfer agent), it is desirable to use one or more kinds of persulfate salts and bisulfurous acids (bisulfites), respectively, in combination. Herewith, a sulfonic acid group can be efficiently introduced at a main chain terminal of the polymer, and there can be obtained a low molecular weight, water soluble polymer which is excellent not only in dispersing ability and chelating ability but also in gelation resistance. Thus, it becomes possible for the function and effect of the present invention to be effectively exhibited. By adding the bisulfurous acids (bisulfites) to the initiator system in addition to the persulfates, the molecular weight of the polymer obtained is prevented from becoming higher than necessary, and a low molecular weight polymer can be produced efficiently.

The persulfates specifically includes sodium persulfate, potassium persulfate, ammonium persulfate, and the like.

Furthermore, in the present invention, the bisulfurous acids (bisulfites) are as described above, but preferable among them are sodium bisulfite, potassium bisulfite, and ammonium bisulfite.

As regards a ratio of addition when the persulfates are used together with the bisulfurous acids (bisulfites), the bisulfurous acids (bisulfites) are added, relative to 1 mass part of the persulfates, in a range of preferably 0.1 to 5 mass parts, more preferably 0.2 to 3 mass parts, and even more preferably 0.2 to 2.5 mass parts. When the amount of the bisulfurous acids (bisulfites) is less than 0.1 mass part relative to 1 mass part of the persulfates, the effect due to the bisulfurous acids (bisulfites) tends to decrease. Therefore, an amount of the sulfonic acid group introduced at the terminal of the polymer decreases, and gelation resistance of the copolymer tends to decrease. Further, the weight average molecular weight of the (meth)acrylic acid-based copolymer tends to increase. On the other hand, when the amount of the bisulfurous acids (bisulfites) exceeds 5 mass parts relative to 1 mass part of the persulfates, the bisulfurous acids (bisulfites) tend to be supplied in excess (consumed uselessly) in the polymerization reaction system in a situation that the effect of the bisulfurous acids (bisulfites) is not obtained as expected from the ratio of addition. Therefore, the excess bisulfurous acids (bisulfites) are decomposed in the polymerization reaction system, resulting in generation of a large amount of sulfurous acid gas ($SO_2$ gas). In addition, many impurities are generated in the (meth)acrylic acid-based copolymer, and performance of the (meth)acrylic acid-based copolymer tends to deteriorate. Furthermore, during storage at low temperature, impurities tend to precipitate easily.

As regards the amount of addition when the persulfates and the bisulfurous acids (bisulfites) are used, the total amount of the persulfates and the bisulfurous acids (bisulfites) is, relative to 1 mole of the monomer mixture, preferably 2 to 20 g, more preferably 2 to 15 g, even more preferably 3 to 10 g, and further even more preferably 4 to 9 g. When the amount of addition of the persulfates and the bisulfurous acids (bisulfites) is less than 2 g, the molecular weight of the polymer obtained tends to increase. In addition, the amount of the sulfonic acid group introduced at the terminal of the (meth)acrylic acid-based copolymer obtained tends to decrease. On the other hand, when the amount of addition exceeds 20 g, the effect of the persulfates and the bisulfurous acids (bisulfites) becomes unable to obtain as expected from the amount of addition and, on the contrary, purity of the (meth)acrylic acid-based copolymer tends to decrease.

The persulfates may be added in a form of a persulfate solution (preferably an aqueous solution) by dissolving the same in the after-mentioned solvents, preferably water. When the persulfates are used as a solution (preferably an aqueous solution), the concentration thereof is preferably 1 to 35 mass %, more preferably 5 to 35 mass %, and even more preferably 10 to 30 mass %. Here, when the concentration of the persulfate solution is less than 1 mass %, the concentration of the product decreases, resulting in cumbersome transportation and storage. On the other hand, when the concentration of the pesulfate solution exceeds 35 mass %, handling of the product becomes difficult.

The bisulfurous acids (bisulfites) may be added in a form of a solution (preferably an aqueous solution) of bisulfurous acids (bisulfites) by dissolving the same in the after-mentioned solvents, preferably water. When the bisulfurous acids (bisulfites) are used as a solution (preferably an aqueous solution), the concentration thereof is preferably 10 to 42 mass %, more preferably 20 to 42 mass %, and even more preferably 32 to 42 mass %. Here, when the concentration of the solution of the bisulfurous acids (bisulfites) is less than 10 mass %, the concentration of the product decreases, resulting in cumbersome transportation and storage. On the other hand, when the concentration of the solution of the bisulfurous acids (bisulfites) exceeds 42 mass %, handling becomes difficult.

<Other Additives>

In the method for producing the (meth)acrylic acid-based copolymer, as additives other than the initiator and the chain transfer agent, which can be used in the polymerization reaction system when polymerizing the monomer mixture in an aqueous solution, there can be added an appropriate amount of a suitable additive, for example, a heavy metal concentration adjusting agent, a pH adjusting agent, and the like in a range which does not affect the function and effect of the present invention.

The heavy metal concentration adjusting agent is not particularly limited and, for example, polyvalent metal compounds or elementary substances can be used. Specifically, there can be mentioned water soluble polyvalent metal salts such as vanadium oxytrichloride, vanadium trichloride, vanadyl oxalate, vanadyl sulfate, vanadic acid anhydride, ammonium metavanadate, ammonium hypovanadous sulfate: $[(NH_4)_2SO_4 \cdot VSO_4 \cdot 6H_2O]$, ammonium vanadous sulfate: $[(NH_4)V(SO_4)_2 \cdot 12H_2O]$, copper(II) acetate, copper(II), copper(II) bromide, copper(II) acetylacetate, ammonium cupric chloride, ammonium copper chloride, copper carbonate, copper(II) chloride, copper(II) citrate, copper(II) formate, copper(II) hydroxide, copper nitrate, copper naphthenate, copper(II) oleate, copper maleate, copper phosphate, copper(II) sulfate, cuprous chloride, copper(I) cyanide, copper iodide, copper(I) oxide, copper thiocyanate, iron acetylacetate, ammonium iron citrate, ammonium ferric oxalate, ammonium iron sulfate, ammonium ferric sulfate, iron citrate, iron fumarate, iron maleate, ferrous lactate, ferric nitrate, iron pentacarbonyl, ferric phosphate, ferric pyrophosphate, and the like; polyvalent metal oxides such as vanadium pentoxide, copper(II) oxide, ferrous oxide, ferric oxide, and the like; polyvalent metal sulfides such as iron (III) sulfide, iron(II) sulfide, copper sulfide, and the like; copper powder, iron powder, and the like.

In the method for producing the (meth)acrylic acid-based copolymer, the concentration of the heavy metal ions in the (meth)acrylic acid-based copolymer obtained is preferably 0.05 to 10 ppm, and therefore it is desirable to add, if necessary, an appropriate amount of the heavy metal concentration adjusting agent.

(Polymerization Solvent)

In the production of the (meth)acrylic acid-based copolymer, the monomer mixture is usually polymerized in a solvent, whereat the solvent used in the polymerization reaction system is preferably an aqueous solvent such as water, alcohols, glycols, glycerin, polyethylene glycols, and the like, with water being especially preferable. These can be used solely or in a combination of two or more kinds. Furthermore, in order to improve solubility of the monomer mixture in the solvent, there may be suitably added an organic solvent in a range which does not adversely affect polymerization of each monomer.

As the organic solvent, specifically, there can be used one kind or two or more kinds by selecting from lower alcohols such as methanol, ethanol, and the like; amides such as dimethylformamide and the like; and ethers such as diethyl ether, dioxane, and the like.

An amount of the solvent to be used is, relative to the total amount of the monomer mixture, in a range of preferably 40 to 200 mass %, more preferably 45 to 180 mass %, and even more preferably 50 to 150 mass %. When the amount of the solvent to be used is less than 40 mass %, a molecular weight of the copolymer becomes high. On the other hand, when the amount of the solvent to be used exceeds 200 mass %, the concentration of the (meth)acrylic acid-based copolymer produced becomes low and, depending on the situation, removal of the solvent becomes necessary. Meanwhile, while much or all of the solvent may be charged in a reaction vessel at an initial stage of polymerization, a portion of the solvent, for example, may suitably be added (dropwise) solely into the reaction system. Or the portion of the solvent may be added (dropwise) into the reaction system during polymerization together with the monomer mixture component, the initiator component, and the other additives in a form of a solution obtained by dissolving these in the solvent beforehand.

(Polymerization Temperature)

Polymerization temperature of the monomer mixture is not particularly limited. From the viewpoint of producing a polymer efficiently, the polymerization temperature is preferably 50° C. or higher, and more preferably 70° C. or higher; or preferably 99° C. or lower, and more preferably 95° C. or lower. When the polymerization temperature is less than 50° C., the molecular weight becomes high, impurities increase, and additionally the polymerization time becomes too long, resulting in decreased productivity. On the other hand, when bisulfurous acids (bisulfites) are used as an initiator system, setting the polymerization temperature at 99° C. or lower is preferable because it can prevent generation of a large amount of sulfurous acid gas due to decomposition of the bisulfurous acids (bisulfites). Here, the term "polymerization temperature" refers to the temperature of a reaction solution inside the reaction system.

Especially, in a method of initiating polymerization at from room temperature (room temperature initiating method), when polymerization is carried out, for example, for 180 minutes per batch (180 minute recipe), the temperature of the reaction solution is designed so that it reaches a preset temperature (may be within the above range of polymerization temperature, but is preferably about 70 to 90° C. and more preferably about 80 to 90° C.) within 70 minutes, preferably 0 to 50 minutes, and more preferably 0 to 30 minutes. It is desirable that, thereafter, the preset temperature is maintained until completion of the polymerization. When heat-up time deviates from the above range, there is a fear that the molecular weight of the (meth)acrylic acid-based copolymer obtained may become high. Meanwhile, the above shows an example where the polymerization time is 180 minutes but, when a prescribed polymerization time is different, the heat-up time is desirably set with reference to this example so that a proportion of the heat-up time to the polymerization time becomes similar.

(Pressure of Reaction System, Reaction Atmosphere)

When carrying out the polymerization of the monomer mixture, pressure in the reaction system is not particularly limited and may be under any of normal pressure (atmospheric pressure), reduced pressure, and increased pressure. When bisulfurous acids (bisulfites) are used as an initiator system, the polymerization is preferably carried out under normal pressure or under increased pressure with the reaction system being closed in order to prevent discharge of a sulfurous acid gas and to make reduction of the molecular weight possible. Furthermore, when the polymerization is carried out under normal pressure (atmospheric pressure), there is no need to install a pressurizing device and a pressure reducing device together, and also there is no need to use pressure-tight reaction vessels and pipes. Therefore, from the viewpoint of production cost, normal pressure (atmospheric pressure) is preferable. That is, depending on a purpose of use of the (meth)acrylic acid-based copolymer obtained, there may be arbitrarily set the most appropriate pressure condition.

An atmosphere in the reaction system may continue to be an air atmosphere but is preferably changed to an inert gas atmosphere. For example, it is desirable to replace the inside of the reaction system with an inert gas such as nitrogen and the like prior to the start of the polymerization. Herewith, it can be prevented that an atmosphere gas (for example, an oxygen gas and the like) inside the reaction system dissolves in a liquid phase and acts as a polymerization inhibitor. As a result, decrease of the initiator (persulfate and the like) due to deactivation is prevented, and further reduction of the molecular weight of the copolymer becomes possible.

(Degree of Neutralization During Polymerization)

In the method for producing the (meth)acrylic acid-based copolymer, the polymerization reaction of the monomer mixture is preferably carried out under an acidic condition. By carrying out the reaction under an acidic condition, a viscosity increase of an aqueous solution of the polymerization reaction system can be suppressed and a low molecular weight (meth)acrylic acid-based copolymer can be produced efficiently. Moreover, because the polymerization reaction can be run under a condition of higher concentration than before, production efficiency can be substantially improved. Especially, by setting a degree of neutralization during polymerization low in a range of 0 to 25 mol %, an effect due to the reduction of the amount of initiator can be improved synergistically, and the impurity reducing effect can be markedly improved. Further, it is desirable to adjust pH of a reaction solution during polymerization to 1 to 6 at 25° C. By carrying out the polymerization reaction under such an acidic condition, the polymerization can be conducted in high concentration and in one step, making it possible even to skip a concentration step. Therefore, productivity is substantially improved, and increase in production cost can also be suppressed.

Among the acidic conditions, the pH at 25° C. of the reaction solution during polymerization is preferably 1 to 6, more preferably 1 to 5, and even more preferably 1 to 4. In case the pH is less than 1, when, for example, the bisulfurous acids (bisulfites) are used as an initiator system, there is a fear that generation of a sulfurous acid gas and corrosion of the equipment may occur. On the other hand, in case the pH exceeds 6, when the bisulfurous acids (bisulfites) are used as an initiator system, efficiency of the bisulfurous acids (bisulfites) decreases, and the molecular weight increases.

A pH adjusting agent to adjust the pH of the reaction solution includes alkali metal hydroxides such as sodium hydroxide, potassium hydroxide, and the like; alkaline earth metal hydroxides such as calcium hydroxide, magnesium hydroxide, and the like; organic amines such as ammonia, monoethanolamine, triethanolamine, and the like. These may be used solely or in a combination of two or more kinds. Among these, alkali metal hydroxides such as sodium hydroxide, potassium hydroxide, and the like are preferable, and sodium hydroxide is especially preferable. In the present specification, these materials may also be referred to simply as the "pH adjusting agent" or the "neutralizing agent."

The degree of neutralization of a carboxylic acid during polymerization is preferably in a range of 0 to 30 mol %, more preferably 1 to 25 mol %, and even more preferably 2 to 23 mol %. When the degree of neutralization during polymerization is in such a range, copolymerization can be carried out most efficiently, and a polymer can be produced with reduced impurities and with good gelation resistance. Furthermore, a low molecular weight polymer can be produced efficiently without increase in viscosity of the aqueous solution in the polymerization reaction system. Moreover, because the polymerization reaction can be made to proceed under a condition of higher concentration than before, production efficiency can be improved substantially.

On the other hand, when the degree of neutralization during polymerization exceeds 25 mol %, there are cases that chain transfer efficiency of the bisulfurous acids (bisulfites) decreases and the molecular weight increases. In addition, as the polymerization proceeds, increase in the viscosity of the aqueous solution of the polymerization reaction system becomes pronounced. As a result, the molecular weight of the polymer obtained increases more than necessary, and it becomes impossible to obtain the low molecular weight polymer. Furthermore, there is a case where the effect of reduction in the degree of neutralization is not exerted sufficiently and, in some cases, it becomes difficult to reduce impurities substantially.

Here, a method of neutralization is not particularly limited. For example, a salt of (meth)acrylic acid such as sodium (meth)acrylate and the like may be used as part of the raw materials, or neutralization may be carried out during polymerization using an alkali metal hydroxide such as sodium hydroxide and the like as the neutralizing agent, or these methods may be used together. In addition, a form of the neutralizing agent to be added when carrying out neutralization may be a solid or an aqueous solution dissolved in a suitable solvent, preferably water.

When an aqueous solution is used, the concentration thereof is preferably 10 to 60 mass %, more preferably 20 to 55 mass %, and even more preferably 30 to 50 mass %.

When the concentration of the aqueous solution is less than 10 mass %, the concentration of the product decreases, and transportation and storage thereof become cumbersome. When the concentration exceeds 60 mass %, there is a fear of precipitation, and liquid transport of the product becomes cumbersome because the viscosity thereof also increases.

(Conditions for Adding Raw Materials)

When carrying out the polymerization, the monomer mixture, the initiator, and the other additives such as the chain transfer agent and the like are preferably dissolved beforehand in suitable solvents (preferably the same kind of solvent as that of the solution which is added dropwise) to form a monomer mixture solution, an initiator solution, and a solution of other additives such as a chain transfer agent solution. It is preferable that the polymerization is carried out by continuous dropwise addition of each of these over a prescribed time of dropwise addition to an (aqueous) solvent (if necessary, temperature of which is adjusted to a predetermined value) charged in a reaction vessel. Further, a part of the aqueous solvent, apart from the initially charged solvent which is added beforehand in the vessel in the reaction system, may be added dropwise later. However, the present invention is not limited to such a production method.

For example, with regard to a method of dropwise addition, the solutions may be added dropwise continuously or they may be added in several portions intermittently. A part or all of one kind or two or more kinds of the monomers may be charged initially. Furthermore, rates of dropwise addition (amounts of dropwise addition) of one kind or two or more kinds of the monomers may be the same all of the time from the start to the end of the dropwise addition, or the rates of dropwise addition (amounts of dropwise addition) may be changed with time depending on the polymerization temperature and the like. Furthermore, when each component is added dropwise in a form of a solution, the solution to be added dropwise may be heated to the same level as the polymerization temperature in the reaction system. Having it done this way, temperature fluctuation becomes less and temperature adjustment becomes easier when the polymerization temperature is kept constant.

As regards a time of dropwise addition of the monomer when polymerization is carried out, completion of the dropwise addition of the monomer (B) is earlier than completion of the dropwise addition of the monomer (A) preferably by 1 to 50 minutes, more preferably by 1 to 40 minutes, and even more preferably 1 to 30 minutes.

When the bisulfurous acids (bisulfites) are used as the initiator system, the molecular weight at the early stage of polymerization greatly affects the final molecular weight. Therefore, in order to lower the initial molecular weight, it is desirable to add (dropwise) 5 to 40 mass % of the bisulfurous acids (bisulfites) or a solution thereof preferably within 60 minutes, more preferably within 30 minutes, and even more preferably within 10 minutes from the start of the polymerization. Especially, as will be described later, this is effective when polymerization is initiated from the room temperature.

Additionally, among the components added dropwise when carrying out the polymerization, when the bisulfurous acids (bisulfites) are used as the initiator system, the dropwise addition of the bisulfurous acids (bisulfites) or a solution thereof is completed earlier than the dropwise addition of the monomer (A) preferably by 1 to 30 minutes, more preferably 1 to 20 minutes, and even more preferably by 1 to 15 minutes. This makes it possible to decrease the amount of the bisulfurous acids (bisulfites) after completion of polymerization and can effectively and efficiently suppress generation of the sulfurous acid gas and formation of impurities due to the bisulfurous acids (bisulfites). Thus, impurities produced after completion of the polymerization by dissolution of the sulfurous acid gas in a gas phase into a liquid phase can be decreased dramatically. When the bisulfurous acids (bisulfites) are remaining after completion of the polymerization, they may form impurities which may lead to deterioration of performance of the polymer, precipitation of impurities when stored at low temperature, and the like. Therefore, at the end of polymerization, it is desirable that the initiator system containing the bisulfurous acids (bisulfites) is consumed and is not remaining.

Here, when the dropwise addition of the bisulfurous acids (bisulfites) (solution) can be completed earlier than the dropwise addition of the monomer (A) by only less than one minute, there are cases where the bisulfurous acids (bisulfites) remain after completion of the polymerization. Such cases include a case where the dropwise addition of the bisulfurous acids (bisulfites) ends at the same time with the dropwise addition of the monomer (A), and a case where the dropwise addition of the bisulfurous acids (bisulfites) ends later than the dropwise addition of the monomer (A). In such cases, it tends to be difficult to suppress generation of the sulfurous acid gas and formation of impurities effectively and efficiently, and the initiator which remains may exert harmful effects on thermal stability of the polymer obtained. On the other hand, when the dropwise addition of the bisulfurous acids (bisulfites) or a solution thereof is completed earlier than the dropwise addition of the monomer (A) by more than 30 minutes, the bisulfurous acids (bisulfites) are consumed before completion of the polymerization. Therefore, the molecular weight tends to increase. In addition, because the rate of dropwise addition of the bisulfurous acids (bisulfites) is fast relative to the rate of addition of the monomer (A) and, because a large amount is added dropwise in a short time period, impurities and a sulfurous acid gas tend to be generated in a large amount during this period of dropwise addition.

Further, among the components added dropwise when carrying out the polymerization, when a persulfate salt (solution) is used as the initiator system, completion of the dropwise addition of the persulfate salt (solution) is desirably delayed than completion of the dropwise addition of the monomer (A) preferably by 1 to 30 minutes, more preferably 1 to 25 minutes, and even more preferably by 1 to 20 minutes. This makes it possible to substantially decrease impurities due to residual monomers. For example, the amount of the monomer component remaining after completion of the polymerization can be decreased.

Here, when completion of the dropwise addition of the persulfate salt (solution) can be delayed than completion of the dropwise addition of the monomer (A) by only less than one minute, there are cases where the monomers are remaining after completion of the polymerization. Such cases include a case where the dropwise addition of the persulfate salt (solution) ends at the same time with the dropwise addition of the monomer (A), and a case where the dropwise addition of the persulfate salt (solution) ends earlier than the dropwise addition of the monomer (A). In such cases, it tends to be difficult to suppress formation of impurities effectively and efficiently. On the other hand, when completion of the dropwise addition of the persulfate (solution) is delayed than completion of the dropwise addition of the monomer (A) by more than 30 minutes, there is a fear that the persulfate or decomposition products thereof remains after completion of the polymerization and form impurities.

(Polymerization Time)

When carrying out the polymerization, even when polymerization temperature is lowered and bisulfurous acids (bisulfites) are used as an initiator system, it is more important to suppress generation of a sulfurous acid gas and prevent formation of impurities. Therefore, the total time of dropwise addition when carrying out the polymerization is desirably extended to preferably 150 to 600 minutes, more preferably 160 to 450 minutes, and even more preferably 180 to 300 minutes.

When the total time of dropwise addition is less than 150 minutes, effects of the persulfate salt solution and the solution of bisulfurous acids (bisulfites) which are added as the initiator systems tend to decrease, and thus an amount of the sulfur-containing group such as the sulfonic acid group and the like, which are introduced at the main chain terminal of the (meth)acrylic acid-based copolymer obtained, tends to decrease. As a result, the weight average molecular weight of the polymer tends to increase.

Furthermore, dropwise addition into the reaction system, which is carried out in a short period of time, may cause bisulfurous acids (bisulfites) to exist in excess. Therefore, in some cases, such excess bisulfurous acids (bisulfites) decompose to generate a sulfurous acid gas, which may be discharged out of the system or may form impurities. However, this can be improved by carrying out the polymerization with the polymerization temperature and the amount of the initiator being set in low, specific ranges.

On the other hand, when the total time of dropwise addition exceeds 600 minutes, generation of the sulfurous acid gas is suppressed and, therefore, performance of the polymer obtained is good. However, productivity decreases and there are cases where the use purpose of the polymer is limited. Here, the term "the total time of dropwise addition" refers to the time period from the start of dropwise addition of the first component to be added dropwise (not necessarily one component) to the completion of dropwise addition of the last component to be added dropwise (not necessarily one component).

(Solid Content Concentration of Polymerization Solution Based on Monomer)

A solid content concentration of an aqueous solution (that is, a solid content concentration of the polymerization solution, including the monomer, the polymerization initiator, and the chain transfer agent) at completion of dropwise addition of all of the monomer, the polymerization initiator, and the chain transfer agent is preferably 35 mass % or more, more preferably 40 to 70 mass %, and even more preferably 42 to 65 mass %. When the solid content concentration at the end of the polymerization reaction is 35 mass % or more, the polymerization can be carried out in high concentration and in one step. Therefore, a low molecular weight (meth)acrylic acid-based copolymer can be obtained efficiently and thus, for example, a concentration step can be skipped. Therefore, production efficiency and productivity of the copolymer can be substantially improved and a production cost can be suppressed.

Here, when the solid content concentration of the polymerization reaction system is increased, increase in viscosity of the reaction solution becomes prominent with progress of the polymerization reaction, and the weight average molecular weight of the polymer obtained also tends to increase substantially. However, by carrying out the polymerization reaction in an acidic side (a range where the pH is 1 to 6 at 25° C. and the degree of neutralization of the carboxylic acid is 0 to 25 mol %), the increase in viscosity of the reaction solution with progress of the polymerization reaction can be suppressed. Therefore, a low molecular weight polymer can be obtained even when the polymerization reaction is carried out under a high concentration condition, and the production efficiency of the polymer can be improved substantially.

(Aging Step)

In the method for producing the (meth)acrylic acid-based copolymer, there may be provided an aging step with an aim to improve conversion of the monomer and the like after completion of dropwise addition of all of the monomer. A time period of aging is usually 1 to 120 minutes, preferably 5 to 90 minutes, and more preferably 10 to 60 minutes. When the time period of aging is less than 1 minute, a monomer component sometimes remains due to insufficient aging, and there is a fear that impurities attributable to the residual monomer are formed and invite deterioration of performance and the like. On the other hand, when the time period of aging exceeds 120 minutes, there is a fear that the polymerization solution may discolor.

A preferable temperature of the polymer solution in the aging step is in the same range as the polymerization temperature. Therefore, the temperature here may also be kept at a constant temperature (preferably the temperature at the end of the dropwise addition), or the temperature may be changed with time during the aging.

(Post-Polymerization Step)

In the method for producing the (meth)acrylic acid-based copolymer, it is preferable to carry out the polymerization under an acidic condition as described above. Therefore, the degree of neutralization of the carboxylic acid (the final degree of neutralization of the carboxylic acid) of the (meth)acrylic acid-based copolymer may, if necessary, be set in a predetermined range by suitably adding, as an after-treatment, an appropriate alkaline component after completion of the polymerization. The alkaline component includes alkali metal hydroxides such as sodium hydroxide, potassium hydroxide, and the like; alkaline earth metal hydroxides such as calcium hydroxide, magnesium hydroxide, and the like; and organic amines such as ammonia, monoethanolamine, diethanolamine, triethanolamine, and the like.

The final degree of neutralization is not particularly limited because it differs depending on the use purpose of the (meth)acrylic acid-based copolymer.

Especially, when the (meth)acrylic acid-based copolymer is used as an acidic polymer, the final degree of neutralization of the carboxylic acid is preferably 0 to 75 mol %, and more preferably 0 to 70 mol %. When the (meth)acrylic acid-based copolymer is used as a neutral or an alkaline polymer, the final degree of neutralization of the carboxylic acid is preferably 75 to 100 mol %, and more preferably 85 to 99 mol %. Furthermore, when the (meth)acrylic acid-based copolymer is used as a neutral or an alkaline polymer, there is a fear that the final degree of neutralization exceeding 99 mol % may lead to discoloration of an aqueous solution of the polymer.

Further, when the (meth)acrylic acid-based copolymer is used as an acidic material without neutralization, there are cases where a toxic sulfurous acid gas remains in the reaction system and the atmosphere thereof because it is acidic in the reaction system. In such a case, it is desirable to decompose the sulfurous acid gas by addition of peroxides such as hydrogen peroxide and the like or to have the sulfurous acid gas flushed out by introduction of (blowing with) air and a nitrogen gas.

In addition, the method for producing the (meth)acrylic acid-based copolymer may be batch-wise or continuous.

The thus obtained (meth)acrylic acid-based copolymer can suppress corrosion of metals in the cooling water system. A mechanism thereof is not necessarily clear. However, because the structural unit (b) derived from the (meth) allyl ether-based monomer (B) represented by the general formula (2) has little interaction with a calcium ion and has high solubility, it can effectively prevent gelation when the copolymer contains the structural unit (b) in an amount of 1 to 15 mol % relative to 100 mol % of structural units derived from all the monomers. Also, because the copolymer contains a sulfonic acid group or a salt thereof at a main chain terminal, it has excellent gelation resistance performance. On the other hand, the carboxyl group of the structural unit (a) derived from the (meth)acrylic acid-based monomer (A) represented by the general formula (1) has a strong affinity for an calcium ion which is a scale component, and is thought to inhibit growth of crystal by adsorbing to a growth point thereof. Furthermore, because it is known that a material containing a carboxyl group has an anti-corrosion performance, it is thought that the copolymer becomes capable of providing a high anti-corrosion effect because it contains the structural unit (a), especially because it contains the structural unit (a) in a ratio of 99 to 50 mol % relative to 100 mol % of structural units derived from all the monomers.

Furthermore, when the weight average molecular weight of the (meth)acrylic acid-based copolymer is 7,000 to 28,000, it shows an excellent anti-corrosion effect and also it hardly gels, and therefore the copolymer is thought to be capable of effectively performing suppression of metal corrosion in the cooling water system.

The (meth)acrylic acid-based copolymer used in the present invention is preferably one comprising a structural unit (a) derived from one kind or two or more kinds of (meth) acrylic acid-based monomers (A) selected from acrylic acid, methacrylic acid, and sodium acrylate, and a structural unit (b) derived from sodium 3-(meth)allyloxy-2-hydroxy-1-propanesulfonate, wherein at least one of main chain terminals is a sulfonic acid group or a salt thereof.

Next, the method for treating a cooling water system of the present invention will be described.

[Method for Treating Cooling Water System]

In the method for treating a cooling water system of the present invention, a treatment agent containing the (meth) acrylic acid-based copolymer is added to a cooling water system having the following water quality to suppress corrosion of metals in the cooling water system.

The (meth)acrylic acid-based copolymer is as described above but is especially preferably a copolymer comprising a structural unit (a) derived from one kind or two or more kinds of (meth)acrylic acid-based monomers (A) selected from acrylic acid (AA), methacrylic acid (MAA), and sodium acrylate (SA); and a structural unit (b) derived from sodium 3-allyloxy-2-hydroxy-1-propane sulfonate (HAPS). More specifically, examples include copolymers such as AA/HAPS, MAA/HAPS, AA/SA/HAPS, AA/MAA/HAPS, and the like. Among these, AA/HAPS is preferable.

Meanwhile, operating conditions when applying the treatment method of the present invention are not particularly limited.

(Water Quality of Cooling Water System)

The method for treating a cooling water system of the present invention is applied to a cooling water system having a water quality where calcium hardness is 250 mg/L or less as $CaCO_3$. Preferably, the method is suitably applied to a cooling water system having a water quality where calcium hardness is preferably 230 mg/L or less, more preferably 200 mg/L or less, even more preferably 100 mg/L or less, and further even more preferably 50 mg/L or less, and preferably 5 mg/L or more, more preferably 10 mg/L or more, even more preferably 20 mg/L or more, and further even more preferably 30 mg/L or more.

A method of addition of the anti-corrosion agent comprising only the (meth)acrylic acid-based copolymer (hereinafter, also referred to as a "copolymer-based anti-corrosion agent"), which is added to such a cooling water system as described above, is not particularly limited and may be added to a position which is desired to be prevented from corrosion, immediately before the position, or the like.

In addition, an amount of addition of the anti-corrosion agent is not particularly limited and can be suitably selected depending on the water quality of the cooling water system to which the agent is added. However, it is desirable to add the agent so that a concentration of the copolymer-based anti-corrosion agent (that is, the (meth)acrylic acid-based copolymer) becomes usually 0.01 to 100 mg/L, preferably 0.1 to 80 mg/L, more preferably 1 to 70 mg/L, and even more preferably 2 to 50 mg/L.

A treatment agent containing the (meth)acrylic acid-based copolymer may contain other components in a range which does not impair the effect of the present invention.

An amount of addition of the treatment agent containing the (meth)acrylic acid-based copolymer, which is added to the cooling water system, is not particularly limited, but it is desirable to add the treatment agent so that the concentration thereof becomes usually 0.01 to 100 mg/L, preferably 0.1 to 80 mg/L, more preferably 1 to 70 mg/L, and even more preferably 2 to 50 mg/L.

The copolymer-based anti-corrosion agent can, if necessary, be used together with other scale inhibitors, anti-corrosion agents, and slime controlling agents.

(Anti-Corrosion Agent which can be Used Together)

The anti-corrosion agent which can be used together includes, for example, phosphonic acids such as hydroxyethylidene diphosphonic acid, phosphonobutane tricarboxylic acid, ethylenediamine tetramethylene phosphonic acid, nitrilotrimethyl phosphonic acid, and the like; normal phosphates; polymeric phosphates; phosphoric acid esters; zinc salts; nickel salts; molybdenum salts; tungsten salts; oxycarboxylic acid salts; triazoles; amines; and the like.

(Scale Inhibitor which can be Used Together)

The scale inhibitor which can be used together includes phosphonic acids such as hydroxyethylidene diphosphonic acid, phosphonobutane tricarboxylic acid, ethylenediamine tetramethylene phosphonic acid, nitrilotrimethyl phosphonic acid, and the like; normal phosphates; polymeric phoshates; polymaleic acid; polyacrylic acid; maleic-acid copolymers; copolymers such as maleic acid/acrylic acid, maleic acid/isobutylene, maleic acid/sulfonic acid, acrylic acid/sulfonic acid, acrylic acid/nonionic group-containing monomer; terpolymers such as acrylic acid/sulfonic acid/nonionic group-containing monomer; and the like.

The sulfonic acid includes, for example, vinylsulfonic acid, allylsulfonic acid, styrenesulfonic acid, isoprenesulfonic acid, 3-allyloxy-2-hydroxypropanesulfonic acid, 2-acrylamido-2-methylpropanesulfonic acid, 2-methacrylamido-2-methylpropanesulfonic acid, 4-sulfobutyl methacrylate, allyloxybenzenesulfonic acid, methallyloxybenzenesulfonic acid, and metal salts thereof.

Further, the nonionic group-containing monomer includes, for example, an alkylamide (alkylamide having an alkyl group of 1 to 5 carbon atoms), hydroxyethyl methacrylate, a mono(meth)acrylate of a (poly)ethylene/propylene oxide where the number of moles of addition is 1 to 30, a monovinyl ether ethylene/propylene oxide where the number of moles of addition is 1 to 30, and the like.

(Slime Controlling Agent which can be Used Together)

The slime controlling agent which can be used together includes, for example, quaternary ammonium salts such as alkyldimethylbenzylammonium chloride and the like, chloromethyltrithiazoline, chloromethylisothiazoline, methylisothiazoline, or ethylaminoisopropylaminomethylthiatriazine, hypochlorous acid, hypobromous acid, a mixture of hypochlorous acid and sulfamic acid, and the like. These may contain an enzyme, a bactericidal agent, a coloring agent, a perfume material, a water-soluble organic solvent, a defoaming agent, and the like.

The scale inhibitor, the anti-corrosion agent, and the slime controlling agent respectively may be used solely or in a combination of two or more kinds.

EXAMPLES

Hereinafter, the present invention will be described in more detail with reference to Examples, but the present invention is limited in any way by these Examples.

Meanwhile, an anti-corrosion test was carried out according to the following method, and measurement of a weight average molecular weight and confirmation of presence or absence of a terminal sulfonic acid group were performed according to the following methods.

(1) Anti-Corrosion Test

A test piece of low-carbon steel (JIS G3141 SPSS-SB) having a size of 50 mm×30 mm×1 mm and a surface area of 0.31 dm$^2$, which was polished with #400 emery paper and degreased with toluene, was selected as a sample. Mass of the sample was measured, and the mass was taken as the mass before test.

To a 5000 ml plastic container, there was charged water obtained by dechlorinating water of Tochigi Prefecture Shimotsuga County Nogi Town in an amount of 5000 ml minus the amounts of respective reagents to be added. After adding thereto an aqueous solution of sodium hydrogen carbonate, an aqueous solution of sodium silicate, a polymer solution containing (meth)acrylic acid-based copolymer shown in Table 2 which will be described later, an aqueous solution of magnesium sulfate, an aqueous solution of sodium chloride, a phosphoric acid solution, an aqueous solution of calcium chloride, and an aqueous solution of zinc sulfate, pH thereof was adjusted with a small amount of an aqueous solution of sodium hydroxide and an aqueous solution of sulfuric acid to obtain test waters of water quality A and water quality B shown in Table 1. That is, test waters of water quality A and water quality B used in after-mentioned Examples 1 to 9 and Comparative Examples 1 to 6 contain, as a polymer in Table 1, the (meth)acrylic acid-based copolymers shown in Examples 1 to 9 and Comparative Examples 1 to 6 in Table 2, respectively.

About 1000 ml of the test water was transferred to a 1000 ml beaker, the beaker was placed in a constant temperature bath of a corrosion testing device maintained at 40° C., and the test piece was screwed onto a rotating shaft, which was dipped in the water and rotated at 170 rpm. The remainder of the test water was injected continuously into the 1000 ml beaker by a roller pump at a rate of 0.8 ml/min.

The test piece was taken out 3 days after it was dipped, the surface of which was washed with an acid to remove corrosion products which adhered, mass of which was measured after drying, and the mass was taken as the mass after test. Subsequently, from the change in mass of the test piece, the corrosion rate (mdd) was calculated according to the following equation and anti-corrosion performance was evaluated:

Corrosion rate (mdd)={mass before test (mg)−mass after test (mg)}/{surface area of test piece (dm$^2$)×number of days of test (days)}.

The test result was evaluated as "A" when the corrosion rate was less than 10 mdd, "B" when the corrosion rate was 10 mdd or higher and less than 20 mdd, "C" when the corrosion rate was 20 mdd or higher and less than 30 mdd, and "D" when the corrosion rate was 30 mdd or higher.

TABLE 1

| Item | | Water quality A | Water quality B |
|---|---|---|---|
| pH | — | 7.4 | 8.6 |
| M alkalinity | mg/L, as CaCO3 | 30 | 200 |
| Calcium hardness | mg/L, as CaCO3 | 30 | 200 |
| Magnesium hardness | mg/L, as CaCO3 | 15 | 100 |
| Silica | mg/L, as SiO2 | 3 | 20 |
| Total phosphoric acid | mg/L, as PO4 | 6 | 4 |
| Zinc ion | mg/L, as Zn | 2 | 2 |
| Polymer | mg/L, as Solid | 5 | 5 |

(2) Measurement of Weight Average Molecular Weight of Copolymer

A weight average molecular weight of a (meth)acrylic acid-based copolymer was measured using gel permeation chromatography ("HLC-8320 GPC" manufactured by Tosoh Corporation) under the following conditions:

Detector: RI;

Column: Shodex Asahipak GF-310-HQ, GF-710-HQ, and GF-1G manufactured by Showa Denko K.K.;

Eluent: 0.1 N aqueous sodium acetate;

Flow rate: 0.5 ml/min;

Column temperature: 40° C.; and

Calibration curve: POLYACRYLIC ACID STANDARD (manufactured by Sowa Science Corporation).

(3) Confirmation of Presence or Absence of Terminal Sulfonic Acid Group in Copolymer From a copolymer (aqueous solution), pH of which had been adjusted to 1, water was distilled off under reduced pressure at room temperature to be dried. Subsequently, $^1$H NMR measurement was performed by using deuterated water as a solvent, and a sulfonic acid group at the polymer main chain terminal of a copolymer was confirmed by presence or absence of a peak at 2.7 ppm derived from introduction of the same group.

Examples 1 to 9 and Comparative Examples 1 to 6

Copolymers in the polymer solutions used in Examples 1 to 9 and Comparative Examples 1 to 6 are copolymers obtained by polymerizing monomers in proportions shown in Table 2, respectively. The weight average molecular weights of and presence or absence of the terminal sulfonic acid groups in the copolymers were as shown in Table 2, respectively.

Furthermore, the corrosion rates (mdd) as results of performing the anti-corrosion performance evaluation tests using the test waters of water quality A and water quality B containing these copolymers were as shown in Table 2, respectively.

TABLE 2

| | (Meth)acrylic acid-based copolymer | | | | | Anti-corrosion test Corrosion rate (mdd) | |
|---|---|---|---|---|---|---|---|
| | | Monomer (mol %) | | Weight | | | |
| Composition | AA | HAPS | HAPS/AA (molar ratio) | average molecular weight | Terminal sulfonic acid group | Water quality A | Water quality B |
| Example 1 | AA/HAPS | 98 | 2 | 0.02 | 9,500 | Present | A | B |
| Example 2 | AA/HAPS | 98 | 2 | 0.02 | 22,500 | Present | A | B |
| Example 3 | AA/HAPS | 95 | 5 | 0.05 | 8,000 | Present | A | A |
| Example 4 | AA/HAPS | 95 | 5 | 0.05 | 12,000 | Present | A | A |
| Example 5 | AA/HAPS | 95 | 5 | 0.05 | 15,000 | Present | A | A |
| Example 6 | AA/HAPS | 95 | 5 | 0.05 | 20,000 | Present | A | A |
| Example 7 | AA/HAPS | 95 | 5 | 0.05 | 25,500 | Present | A | A |
| Example 8 | AA/HAPS | 90 | 10 | 0.11 | 9,500 | Present | B | A |
| Example 9 | AA/HAPS | 90 | 10 | 0.11 | 15,000 | Present | B | A |
| Comparative Example 1 | AA | 100 | — | — | 3,500 | — | D | D |
| Comparative Example 2 | AA/HAPS | 95 | 5 | 0.05 | 5,000 | Present | C | C |
| Comparative Example 3 | AA/HAPS | 85 | 15 | 0.18 | 7,000 | None | C | A |
| Comparative Example 4 | AA/HAPS | 82 | 18 | 0.22 | 8,000 | Present | C | B |
| Comparative Example 5 | AA/HAPS | 80 | 20 | 0.25 | 5,000 | None | C | B |
| Comparative Example 6 | AA/HAPS | 95 | 5 | 0.05 | 12,500 | None | B | C |

AA: acrylic acid
HAPS: sodium 3-allyloxy-2-hydroxy-1-propanesulfonate

In the anti-corrosion tests in Table 2, it can be seen that the corrosion rate in the test water of water quality B (calcium hardness is 200 mg/L as $CaCO_3$) decreases in the order of Comparative Example 1>Comparative Examples 2 and 6>Comparative Examples 4 and 5, Examples 1 and 2>Comparative Example 3, Examples 3 to 9. It can also be seen that, when a copolymer containing HAPS is used, the corrosion rate decreases and, further, when a copolymer is used containing HAPS in an amount of 1 to 15 mol %, having a molecular weight of 7,000 to 28,000, and having a sulfonic acid group at a main chain terminal, the corrosion rate can be decreased remarkably. In Comparative Example 2, it is thought that the anti-corrosion effect deteriorated because a weight average molecular weight of the copolymer is small.

It can be seen that, in test waters of water quality A having lower hardness (calcium hardness is 30 mg/L as $CaCO_3$), the corrosion rate decreases in the order of Comparative Example 1>Comparative Examples 2 to 5>Comparative Example 6, Examples 8 and 9>Examples 1 to 7. It can also be seen that, when a copolymer containing HAPS is used, the corrosion rate decreases and, further, when a copolymer is used containing HAPS in an amount of 1 to 15 mol %, having a molecular weight of 7,000 to 28,000, and having a sulfonic acid group at a main chain terminal, the corrosion rate can be decreased remarkably. It is thought that this is because, by having a sulfonic acid group at a main chain terminal, performance of the copolymer to prevent precipitation of calcium phosphate is enhanced, and calcium phosphate which is an anti-corrosion component forms an anti-corrosion film on a metal surface without precipitating in water.

When Comparative Example 6 and Example 4 are compared, it can be seen that the anti-corrosion effect is improved by the presence of a sulfonic acid group at a main chain terminal.

From the above-mentioned results, it can be seen that the polymer which could decrease the corrosion rate in both test waters of water quality A and water quality B was a polymer comprising acrylic acid and HAPS wherein a content of HAPS is 1 to 15 mol % and a weight average molecular weight is 7,000 to 28,000, and further a polymer, wherein at least one of main chain terminals is a sulfonic acid group or a salt thereof, has a higher anti-corrosion effect in water quality where calcium hardness is low.

INDUSTRIAL APPLICABILITY

The method for treating a cooling water system of the present invention can effectively prevent metal corrosion of heat-transfer surfaces of a heat exchanger, a pipe, and the like without adding a chemical agent of high concentration in a water system where water of low calcium hardness is used as makeup water.

The invention claimed is:

1. A method for treating a cooling water system, comprising:
    adding, in a cooling water system of calcium hardness of 250 mg/L or less as $CaCO_3$, a treatment agent containing a (meth)acrylic acid-based copolymer,
    wherein the (meth)acrylic acid-based copolymer comprises a first structural unit derived from a (meth) acrylic acid-based monomer represented by formula (1) and a second structural unit derived from a (meth)allyl ether-based monomer represented by formula (2),
    a content of the second structural unit is 1 to 15 mol % relative to 100 mol % of structural units derived from all the monomers,
    a weight average molecular weight of the (meth)acrylic acid-based copolymer is 7,000 to 28,000, and at least one of main chain terminals of the (meth)acrylic acid-based copolymer is a sulfonic acid group or a salt thereof:

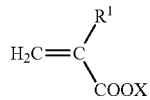
(1)

where $R^1$ represents a hydrogen atom or a methyl group; and
X represents a hydrogen atom, a metal atom, an ammonium group, or an organic amine group; and

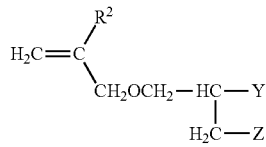
(2)

where $R^2$ represents a hydrogen atom or a methyl group;
Y and Z each independently represent a hydroxyl group, or a sulfonic acid group or a salt thereof; and
at least one of Y and Z represents a sulfonic acid group or a salt thereof.

2. The method for treating a cooling water system according to claim 1, wherein the (meth)acrylic acid-based monomers is one selected from the group consisting of acrylic acid, methacrylic acid, and sodium acrylate, and
the (meth)allyl ether-based monomer is sodium 3-(meth)allyloxy-2-hydroxy-1-propanesulfonate.

3. The method for treating a cooling water system according to claim 1, wherein the (meth)acrylic acid-based monomer is acrylic acid, and
the (meth)allyl ether-based monomer is sodium 3-allyloxy-2-hydroxy-1-propanesulfonate.

4. The method for treating a cooling water system according to claim 1, wherein a content of the second structural unit in the (meth)acrylic acid-based copolymer is 2 to 10 mol % relative to 100 mol % of structural units derived from all the monomers.

5. The method for treating a cooling water system according to claim 1, wherein a content of the first structural unit in the (meth)acrylic acid-based copolymer is 99 to 50 mol % relative to 100 mol % of structural units derived from all the monomers.

6. The method for treating a cooling water system according to claim 1, wherein a molar ratio of the (meth)allyl ether-based monomer/the (meth)acrylic acid-based monomer in the (meth)acrylic acid-based copolymer is 0.01 to 0.2.

7. The method for treating a cooling water system according to claim 1, wherein a weight average molecular weight of the (meth)acrylic acid-based copolymer is 8,000 to 26,000.

8. The method for treating a cooling water system according to claim 1, wherein metal corrosion of a heat-transfer surface of a heat exchanger or a pipe is prevented by adding the treatment agent.

* * * * *